(12) United States Patent
Suzuki et al.

(10) Patent No.: US 6,791,220 B1
(45) Date of Patent: Sep. 14, 2004

(54) LINEAR ACTUATOR

(75) Inventors: Mikihiko Suzuki, Tokyo (JP); Hiroyuki Hirabayashi, Tokyo (JP)

(73) Assignees: Tamagawa Seiki Kabushiki Kaisha, Nagano-ken (JP); KSS Co., Ltd., Tokyo (JP)

( * ) Notice: Subject to any disclaimer, the term of this patent is extended or adjusted under 35 U.S.C. 154(b) by 0 days.

(21) Appl. No.: 10/425,603

(22) Filed: Apr. 30, 2003

(51) Int. Cl.[7] .............................................. H02K 7/06
(52) U.S. Cl. ....................................................... 310/80
(58) Field of Search .................................... 310/20, 80

(56) References Cited

U.S. PATENT DOCUMENTS 4,553,056 A * 11/1985 Pfister .......................... 310/80
6,084,326 A * 7/2000 Nagai et al. .................... 310/80
6,204,585 B1 * 3/2001 Riello et al. ................. 310/159

* cited by examiner

Primary Examiner—Thanh Lam
Assistant Examiner—Judson H. Jones
(74) Attorney, Agent, or Firm—Sughrue Mion, PLLC

(57) ABSTRACT

Disclosed is a linear actuator in which a screw shaft portion is integrally formed on the distal end side of the rotation shaft of the motor, and in which the coupling and one of the support bases are eliminated, thereby achieving a reduction in the number of parts and an improvement in positioning accuracy. The linear actuator includes a screw shaft portion formed on the distal end side of the rotation shaft of a motor and a nut portion threadedly engaged with the screw shaft portion, in which the screw shaft portion and the rotation shaft are formed as an integral unit using the same material and in a seamless state.

8 Claims, 3 Drawing Sheets

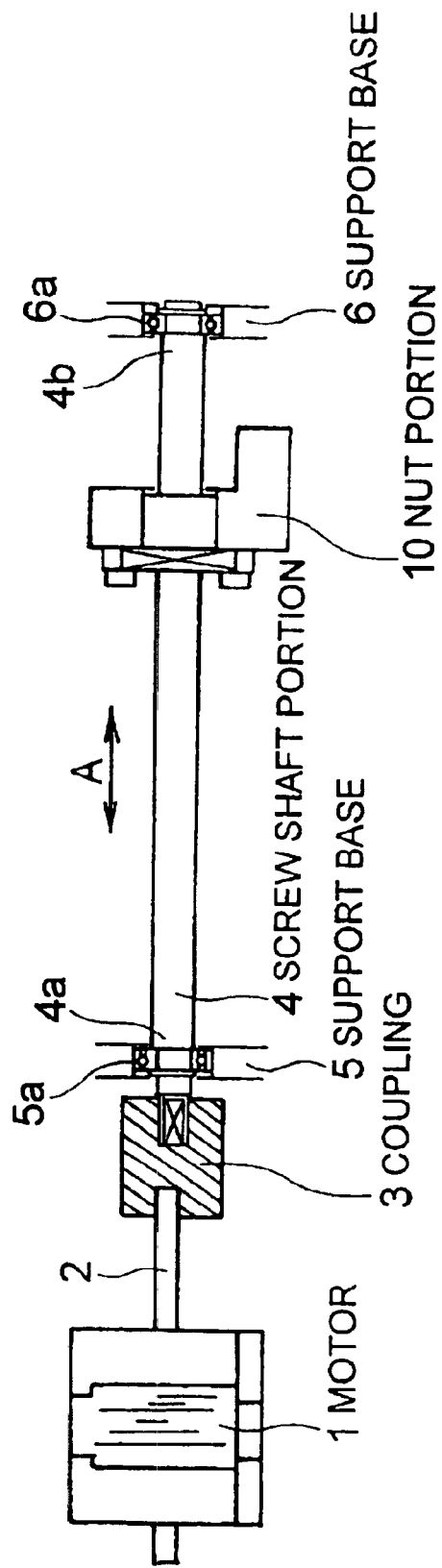
FIG. 3 CONVENTIONAL

LINEAR ACTUATOR

BACKGROUND OF THE INVENTION

1. Field of the Invention

The present invention relates to a linear actuator and, in particular, to a novel linear-actuator construction in which a screw shaft portion is integrally formed at the distal end of the rotation shaft of the motor to eliminate the coupling conventionally required and in which one of the conventional pair of support bases is omitted, thereby substantially simplifying the structure and achieving an improvement in terms of positioning in linear motion and efficiency in power transmission.

2. Description of the Related Art

FIG. 3 shows the construction of a conventional linear actuator of this type generally adopted.

In FIG. 3, reference numeral 1 indicates a motor composed of a step motor or the like. The motor 1 has a rotation shaft 2 connected to a screw shaft portion 4 through the intermediation of a coupling 3 composed of a joint.

The screw shaft portion 4 is supported at its ends 4a and 4b by support bearings 5a and 6a of a pair of support bases 5 and 6. Threadedly engaged with this screw shaft portion 4 is a nut portion 10 constituting a part of the associated stage or table.

In the above-described construction, rotating the screw portion 4 through operation of the motor enables the nut portion 10 to make a reciprocating linear movement in the direction indicated by the arrow A.

The conventional linear actuator, constructed as described above, has the following problems.

In this construction, the rotation shaft of the motor is connected to the screw portion formed separately from the rotation shaft through the intermediation of the coupling, so that the coupling is indispensable, which leads to a rather large number of parts, resulting in high cost. Further, the intermediation of the coupling leads to a rather low efficiency in positioning in linear motion.

Further, since the screw shaft portion is formed as a component separate from the motor rotation shaft, it has to be rotatably supported by a pair of support bases, which requires a rather large space and makes it difficult to achieve a reduction in the number of parts.

SUMMARY OF THE INVENTION

The present invention has been made with a view toward solving the above problems in the prior art. It is accordingly an object of the present invention to provide, in particular, a linear actuator in which the screw shaft portion is integrally formed at the distal end of the rotation shaft of the motor to eliminate the coupling conventionally required and in which one of the conventional pair of support bases is omitted, thereby substantially simplifying the structure and achieving an improvement in terms of positioning in linear motion.

According to the present invention, there is provided a linear actuator including: a screw shaft portion formed on a distal end side of a rotation shaft of a motor; and a nut portion threadedly engaged with the screw shaft portion, in which the nut portion is capable of making a linear reciprocating movement through rotation of the screw shaft portion, and in which the screw shaft portion and the rotation shaft are formed as an integral unit using the same material in a seamless state. In the linear actuator described above, the screw shaft portion has a second diameter which is larger than a first diameter of the rotation shaft. Further, in the linear actuator, the motor is equipped with a first bearing portion composed of a single bearing and a second bearing portion composed of two bearings, and the rotation shaft has a small diameter portion borne by the first bearing portion and a large diameter portion borne by the second bearing portion and having a diameter larger than that of the small diameter portion. Further, in the linear actuator the large diameter portion has a diameter which is the same as the second diameter of the screw shaft portion. Further, the linear actuator has a structure in which the motor is composed of a step motor. Furthermore, in the linear actuator, a step portion is formed by the large diameter portion at a boundary between the small diameter portion and the large diameter portion, and a front end of a rotor provided on the rotation shaft abuts the step portion to undergo positioning. In addition, the linear actuator has a structure in which the rotor is composed of a plurality of magnet plates and a plurality of yoke plates stacked together, and the rotor is situated exclusively on the small diameter portion. Moreover, in the linear actuator, a distal end portion of the screw shaft portion is supported exclusively by a single support base.

BRIEF DESCRIPTION OF THE DRAWINGS

In the accompanying drawings:

FIG. 3 is a schematic diagram, partly in section, showing a conventional linear actuator.

DESCRIPTION OF THE PREFERRED EMBODIMENT

Figure 1:
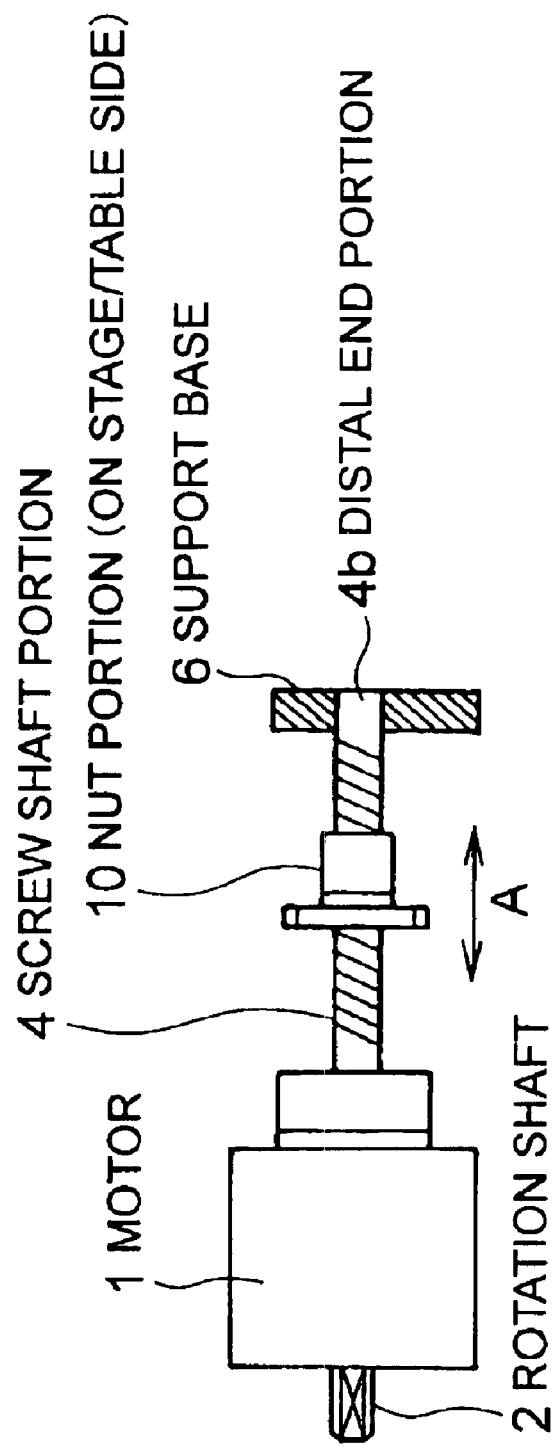
FIG. 1 is a schematic diagram, partly in section, showing a linear actuator according to the present invention.

A preferred embodiment of the linear actuator of the present invention will now be described with reference to the drawings. In the following, the components which are the same as or equivalent to those of the conventional example are indicated by the same reference numerals.

In FIG. 1, reference numeral 1 indicates a motor composed of a step motor (or a servo motor). The motor 1 has a rotation shaft 2 having at its distal end a screw shaft portion 4, with the rotation shaft 2 and the screw shaft portion 4 being formed integrally of the same material in a seamless, solid state.

The screw shaft portion 4 has its distal end portion 4b rotatably supported by the support base 6. The screw shaft portion 4 is threadedly engaged with the nut portion 10 constituting a part of the associated stage or table. The nut portion 10 is capable of making a linear reciprocating movement in the direction of the arrow A.

Figure 2:
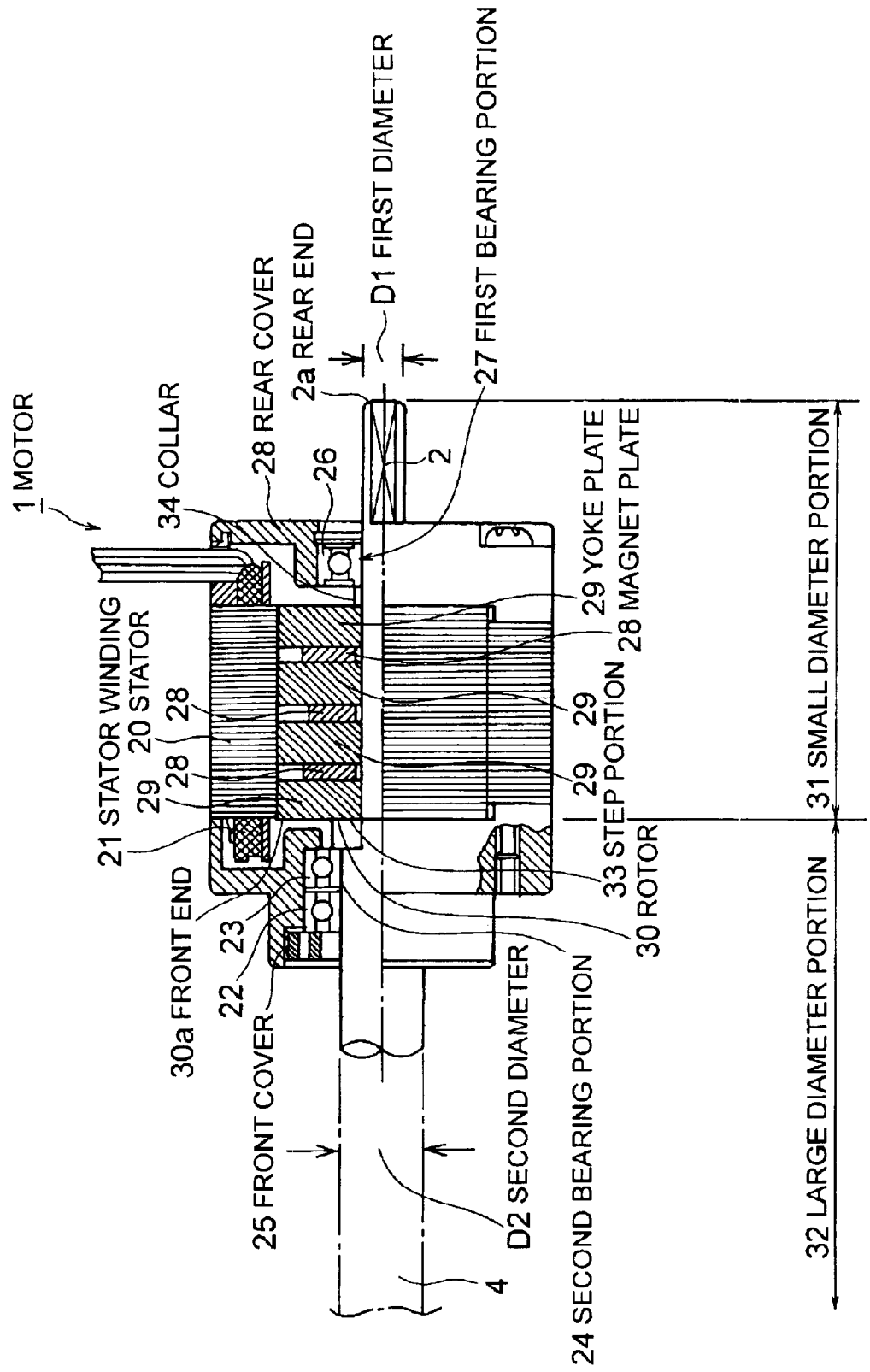
FIG. 2 is an enlarged sectional view of the motor shown in FIG. 1.

FIG. 2 shows the construction of the motor 1 in detail. The motor 1 has a ring-like stator 20 equipped with a stator winding 21. Provided on the front side of the ring-like stator 20 is a front cover 25 having a second bearing portion 24 composed of a pair of bearings 22 and 23.

On the rear side of the ring-like stator 20, there is provided a rear cover 28 having a first bearing portion 27 composed of a single bearing 26.

The rotation shaft 2 is rotatably passed through and extends between the bearing portions 24 and 27. On the rotation shaft 2, a plurality of magnet plates 28 and yoke plates 29 are alternately stacked together in the axial direction, and a rotor 30 is formed by the magnet plates 28 and the yoke plates 29.

As shown in FIG. 2, the rotation shaft 2 is composed of two portions: a small diameter portion 31 extending from the rear end 2a thereof to the front end 30a of the rotor 30 and having a first diameter D1, and a large diameter portion 32 extending from the front end 30a of the rotor 30 to the distal end 4b and having a second diameter D2 which is sufficiently larger than the first diameter.

The first bearing portion 27 rotatably supports the small diameter portion 31, and the second bearing portion 24 rotatably supports the large diameter portion 32. Further, a step portion 33 is formed at the boundary between the small diameter portion 31 and the large diameter portion 32.

Thus, the rotor 30, which is provided exclusively on the small diameter portion 31, abuts the step portion 33 to be thereby secured in position at its distal end. Positioning of the rotor 30 at its rear end is effected by a collar 34 provided on the small diameter portion 31.

Due to the above-described construction of the rotor 30 and the rotation shaft 2, the rotor 30, which is situated on the small diameter portion 31, is capable of generating a larger torque by using the magnet plates 28 and the yoke plates 29 with a larger volume.

Further, the second, duplex bearing portion 24 rotatably supports the large diameter portion 32 with the same large diameter as that of the screw shaft portion 4, whereby it is possible to rotatably support the great load of the nut portion 10 applied to the screw shaft portion 4 formed on the distal end side of the large diameter portion 32 with sufficiency, thereby making it possible for the stage, table or the like (not shown) on the nut portion 10 to safely make a linear reciprocating movement.

The above-described construction of the motor 1, shown in FIG. 2, is only given by way of example, and should not be construed restrictively. Although not shown, other types of motor construction are possible as long as their specifications are such as will provide a predetermined torque and strength. For example, by increasing the axial length of the rotor 30, it is possible to obtain a motor having a diameter smaller than that of the motor 1 of FIG. 2 and a more elongated configuration.

In the case in which the axial length of the rotor 30 is increased, the difference in diameter between the small diameter portion 31 and the large diameter portion 32 of the rotation shaft 2 can be reduced as compared with that of the construction shown in FIG. 2.

Due to the above-described construction, the linear actuator of the present invention provides the following advantages.

The rotation shaft and the screw shaft portion on the distal end side thereof are formed of the same material and connected together in a seamless, solid state, so that there is no need for the coupling conventionally adopted.

Further, one of the pair of support bases conventionally used can be omitted, which also helps to achieve a reduction in the number of parts and in cost as well as space savings.

Further, since the rotation shaft and the screw shaft portion are formed as an integral unit, it is possible to achieve an improvement in positioning accuracy and in the efficiency in motor torque transmission.

What is claimed is:

1. A linear actuator comprising: a screw shaft portion formed on a distal end side of a rotation shaft of a motor; and a nut portion threadedly engaged with the screw shaft portion, wherein the nut portion is capable of making a linear reciprocating movement through rotation of the screw shaft portion, wherein the motor is equipped with a first bearing portion composed of a single bearing and a second bearing portion composed of two bearings, and wherein the rotation shaft has a third diameter portion borne by the first bearing portion and a fourth diameter portion borne by the second bearing portion, said fourth diameter portion having a diameter larger than said third diameter portion.

2. A linear actuator according to claim 1, wherein the screw shaft portion has a second diameter which is larger than a first diameter of the rotation shaft.

3. A linear actuator according to claim 1, wherein the fourth diameter portion has a diameter which is the same as a second diameter of the screw shaft portion.

4. A linear actuator according to claim 2 or 1, wherein the motor is a step motor.

5. A linear actuator according to claim 1, wherein a step portion is formed by the fourth diameter portion at a boundary between the third diameter portion and the fourth diameter portion, and a front end of a rotor provided on the rotation shaft abuts the step portion to undergo positioning.

6. A linear actuator according to claim 5, wherein the rotor is composed of a plurality of magnet plates and a plurality of yoke plates stacked together, and wherein the rotor is situated exclusively on the third diameter portion.

7. A linear actuator according to claim 2 or 1, wherein a distal end portion of the screw shaft portion is supported exclusively by a single support base.

8. A linear actuator according to claim 1, wherein the screw shaft portion and the rotation shaft are formed as an integral unit using the same material in a seamless state.

* * * * *